W. E. MEECHAM.
ROAD VEHICLE.
APPLICATION FILED APR. 11, 1913. RENEWED AUG. 6, 1914.
1,135,461.  
Patented Apr. 13, 1915.
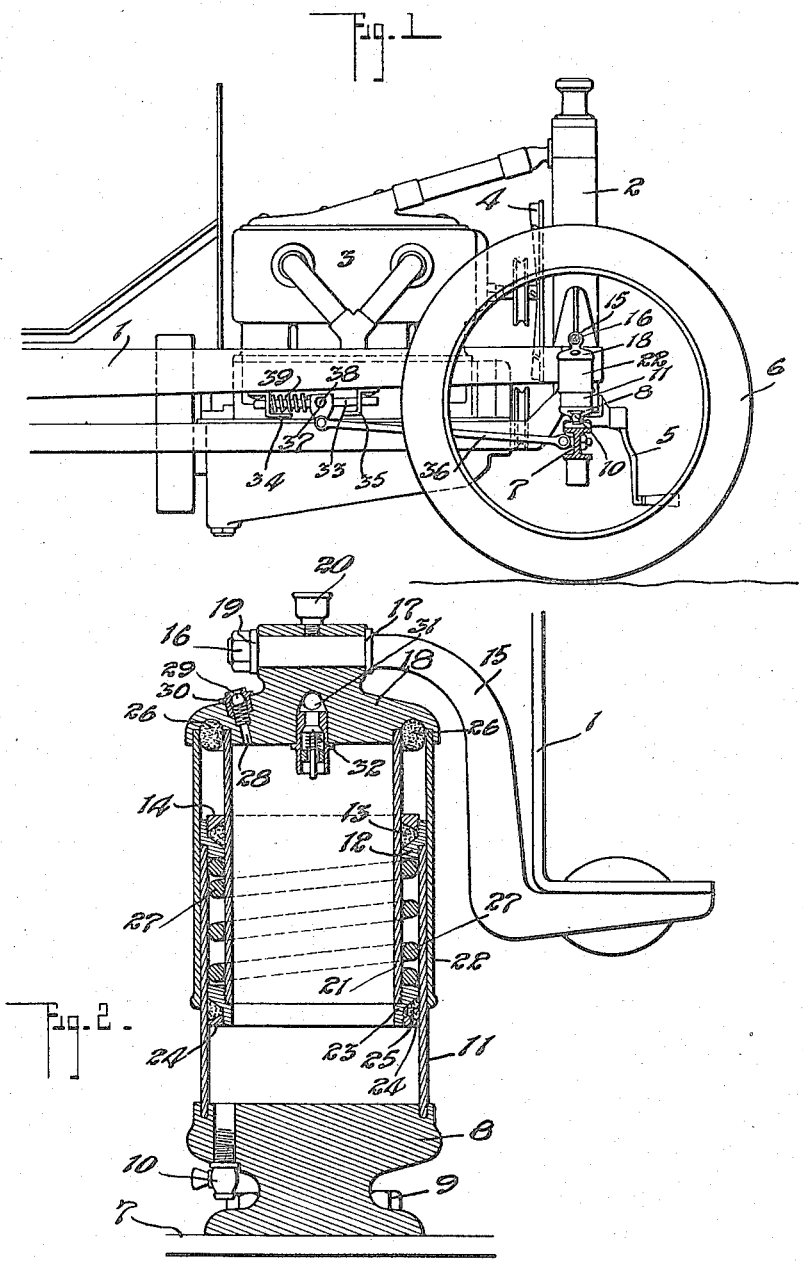
WITNESSES
INVENTOR
W. E. Meecham

UNITED STATES PATENT OFFICE.

WILLIAM EDWARD MEECHAM, OF WINNIPEG, MANITOBA, CANADA.

ROAD-VEHICLE.

1,135,461. Specification of Letters Patent. Patented Apr. 13, 1915.

Application filed April 11, 1913, Serial No. 760,460. Renewed August 6, 1914. Serial No. 855,514.

*To all whom it may concern:*

Be it known that I, WILLIAM EDWARD MEECHAM, of the city of Winnipeg, in the Province of Manitoba, Canada, have invented certain new and useful Improvements in Road-Vehicles, of which the following is the specification.

The invention relates to an improvement in road vehicles, particularly automobiles and the object of the invention is to provide an improved pneumatic suspension for the chassis from the axles and it consists essentially in the arrangement and construction of parts hereinafter more particularly described and later pointed out in the appended claims.

Figure 1 is a side view of the front end of an automobile chassis showing my invention applied. Fig. 2 is an enlarged detailed vertical sectional view through the suspending cylinders.

In the drawing like characters of reference indicate corresponding parts in each figure.

1 represents the chassis or frame of an automobile which carries forwardly the usual radiator 2, engine 3, fan 4 and crank 5 which parts are simply referred to in order that the location of my device will be more clearly understood.

6 represents one of the automobile wheels and 7 the front axle which axle it will be noticed is directly beneath the forward end of the chassis.

8 is a base piece permanently fastened by bolts 9 to the axle and fitted with a drip cock 10.

11 is a central cylinder (relative to those later described) having the lower end permanently embedded in the base piece 8 and the upper end open and fitted with a bearing ring 12 carrying a packing strip 13 held against the bearing ring by a jam nut 14 screw threaded into the upper end of the bearing ring.

15 is a hanger having one end thereof permanently bolted to the chassis and the opposite end fitted with a nut 16, there being a shoulder 17 located on the hanger a short distance from the nut, the purpose of which will be later explained.

18 is a top piece pivotally mounted on the hanger between the shoulder and the nut, it being noticed that a washer 19 is inserted between the face of the nut and the top piece.

20 is an oil cup carried by the top piece and designed to feed oil to that portion of the hanger which passes into the top piece.

21 and 22 are inner and outer cylinders spaced somewhat apart and having their upper ends permanently embedded in the top piece. The lower ends of the cylinders receive between them the upper end of the cylinder 11 which has already been referred to as the central cylinder.

It is here to be noticed that the packing strip 13 bears snugly against the outer face of the cylinder 21, the jam nut 14 being provided so that it can at any time be adjusted to insure a tight fit between the packing strip and the inner cylinder. The lower end of the inner cylinder is screw threaded to receive a bearing ring 23 similar to that 21 which bearing ring is also exteriorly screw threaded to receive a jam nut 24 similar to that 14.

The opposing faces of the ring and jam nut 23 and 24 are beveled presenting a more or less V-shaped groove which receives a packing strip 25. This packing strip bears continuously against the inner face of the center cylinder providing at this point at all times a tight sliding joint and the jam nut 24 can be screwed up at any time to accommodate any wear occurring in the packing strip.

26 is a rubber or other such resilient ring carried by the top piece and located between the cylinders 21 and 22.

27 is a spiral spring inserted between the central cylinder and the inner cylinder, which spring has the ends thereof engaging with the faces of the rings 12 and 23.

28 is a filling opening for oil or such like liquid. This opening is normally closed by a spring pressed ball 29 operating in the casting 30 screw threaded into the top piece.

31 is an air duct formed in the top piece and opening through a spring pressed valve 32 to the interior of the cylinder 21. The valve is so arranged that it admits air under pressure into the cylinder but prevents the escape of the same from the cylinder.

The parts above described in detail constitute the means which I provide for suspending the chassis from the axle. It is here to be understood that a device of this nature is used at each corner of the chassis to suspend the same from the axle.

The cylinder 21 and that portion of the cylinder 11 appearing beneath the cylinder 21 is filled with compressed air passed into the cylinders through the duct 31, the air so entrapped forming virtually a pneumatic cushion betwen the chassis and the axle.

The spring 27 is inserted between the bearing rings to take up any upward throw of the chassis which might occur when the vehicle is passing over rough roads.

33 is a shaft slidably mounted bearing brackets 34 and 35 secured to the chassis a short distance behind the axle.

36 is a bar or link having the forward end thereof pivotally secured to the axle and the rear end thereof pivotally secured to a block 37 carried by the shaft 33, the block being held in any fixed position on the shaft by the adjusting screw 38. 39 is a spiral recoil spring located on the rod between the bracket 34 and the block 37.

I provide a link at each corner of the chassis which is connected with the front of rear axle as the case may be and the chassis as above described.

It will be seen that the above parts allow for any sudden backward thrust of the axle. When this occurs the top pieces 18 swing on the hangers and the links 36 force the shafts 33 back and compress the springs 39.

What I claim as my invention is:—

The combination with the chassis and axle of an automobile or other such like vehicle, of a hanger secured to the chassis and overhanging the axle, a top piece mounted on the hanger and provided with an air inlet duct having a spring pressed valve, a base piece permanently secured to the axle and alined with the top piece, inner and outer cylinders mounted in the top piece, a central cylinder mounted in the base piece and extending upwardly between the former cylinders, bearing rings carried by the lower end of the inner cylinder and the upper end of the central cylinder, packing strips mounted on the bearing rings and contacting respectively with the inner face of the central cylinder and the outer face of the inner cylinder, adjustable jam nuts carried by the rings and engaging with the packing strips and a spiral spring encircling the inner cylinder and having the ends thereof bearing against the bearing rings, as and for the purpose specified.

Signed at Winnipeg this 16th day of January, 1913.

WILLIAM EDWARD MEECHAM.

In the presence of—
G. S. BOXBURGH,
L. SONTO.